United States Patent
Becker et al.

(10) Patent No.: US 9,876,457 B2
(45) Date of Patent: Jan. 23, 2018

(54) ELECTRIC MOTOR COMPRISING A DEVICE FOR GENERATING A SEQUENCE OF SIGNALS

(71) Applicant: Robert Bosch GmbH, Stuttgart (DE)

(72) Inventors: Markus Becker, Oppenau (DE); Ulrich Vollmer, Weilheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/101,501

(22) PCT Filed: Dec. 2, 2014

(86) PCT No.: PCT/EP2014/076227
§ 371 (c)(1),
(2) Date: Jun. 3, 2016

(87) PCT Pub. No.: WO2015/082459
PCT Pub. Date: Jun. 11, 2015

(65) Prior Publication Data
US 2016/0308482 A1   Oct. 20, 2016

(30) Foreign Application Priority Data
Dec. 4, 2013   (DE) .......................... 10 2013 224 876

(51) Int. Cl.
*H02P 1/30* (2006.01)
*H02P 27/08* (2006.01)
*H02P 29/50* (2016.01)
*F04D 25/08* (2006.01)

(52) U.S. Cl.
CPC ............ *H02P 27/085* (2013.01); *H02P 29/50* (2016.02); *F04D 25/08* (2013.01); *H02P 2209/09* (2013.01)

(58) Field of Classification Search
CPC ............ H02P 7/29; H02P 27/085; H02P 8/18
See application file for complete search history.

(56) References Cited

U.S. PATENT DOCUMENTS

| 7,421,193 B2 * | 9/2008 | Kobayashi ................ H02P 7/03 318/599 |
| 2006/0140286 A1 | 6/2006 | Goto et al. |
| 2010/0179700 A1 * | 7/2010 | Lorenz ..................... F16K 31/04 700/282 |

FOREIGN PATENT DOCUMENTS

| DE | 102006014309 | 10/2006 |
| DE | 102013005355 | 10/2013 |
| EP | 0886369 | 12/1998 |
| JP | 2013038916 | 2/2013 |

OTHER PUBLICATIONS

International Search Report for Application No. PCT/EP2014/076227 dated Mar. 27, 2015 (English Translation, 3 pages).

* cited by examiner

*Primary Examiner* — Karen Masih
(74) *Attorney, Agent, or Firm* — Michael Best & Friedrich LLP

(57) ABSTRACT

The invention relates to an electric motor (1), in particular a fan motor, comprising a device (5) for generating a sequence (3) of signals that comprises a plurality of especially blocks (22) of signals. The blocks (22) of signals comprise a plurality of signals (19) having a specific signal duration (20). According to the invention, the signal duration (20) of the individual signals (19) varies.

14 Claims, 5 Drawing Sheets

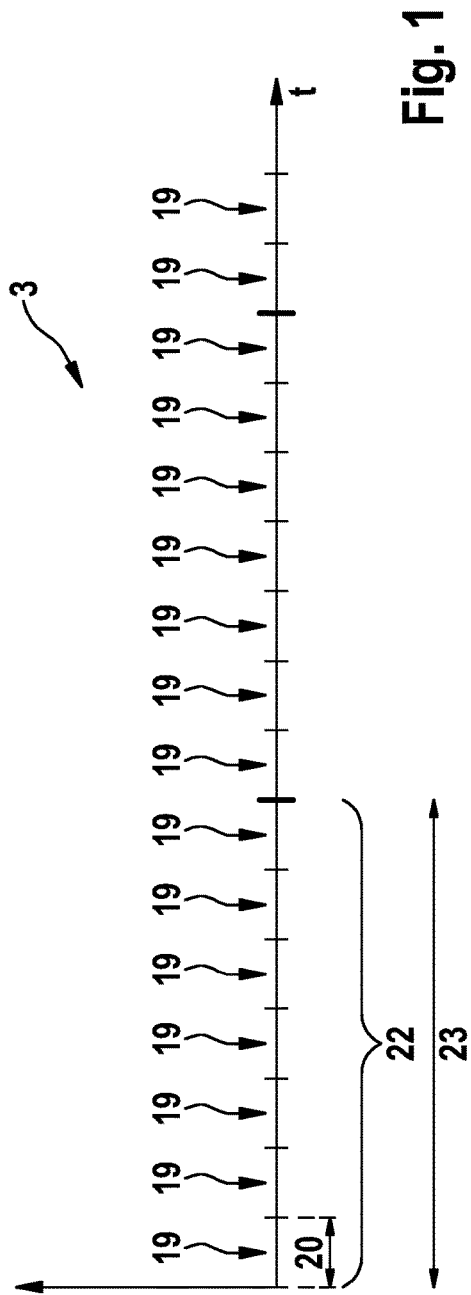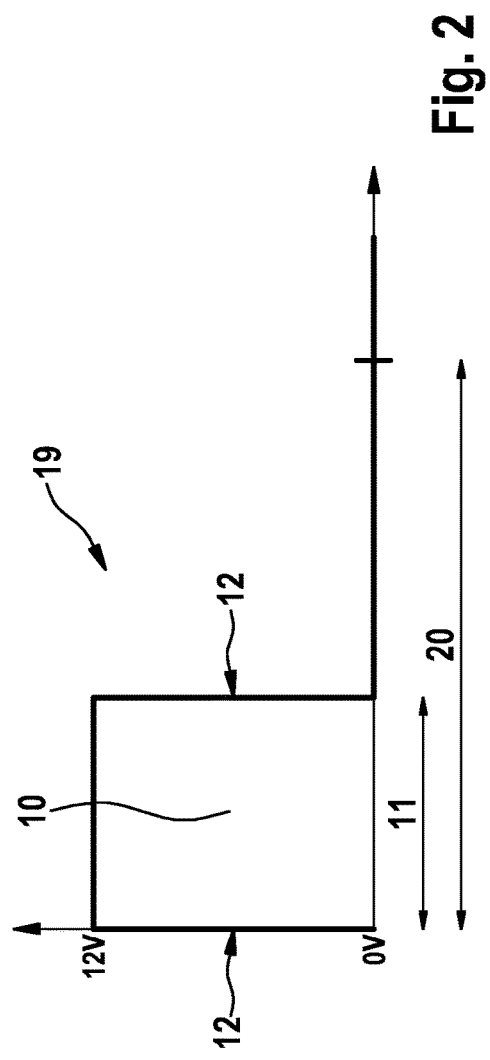

ELECTRIC MOTOR COMPRISING A DEVICE FOR GENERATING A SEQUENCE OF SIGNALS

BACKGROUND OF THE INVENTION

The invention relates to an electric motor comprising a device for generating a sequence of signals.

In the case of modern electric motors, the power output, revolutions per minute, speed and acceleration are regulated or controlled by motor control units. In so doing, the electric motors are controlled via electric switches which are switched into a conducting or blocking state as a function of the position and the desired movement of a rotor. Furthermore, electromagnetic energy is radiated via the electric switches when generating signals, in particular for actuating an electric motor. In addition, the cables which conduct signals operate in accordance with an antenna and induce an electromagnetic radiation.

Electric motors for driving a fan have a constant speed over extended periods of time, which is achieved by a constant sequence of control signals. The electric switches are thus switched at a constant frequency. The entire electromagnetic radiation occurs at few frequencies or respectively in a limited frequency range.

An electric motor comprising a device for generating a sequence of signals is known, wherein the sequence of signals comprises a plurality of signal blocks and the signal blocks comprise a plurality of signals having a specific signal duration. It is also known that the signals themselves can be configured as a pulse, wherein each pulse comprises a different energy content depending on the pulse width or corresponds to an item of information. Such a signal is referred to as a pulse-width modulated signal.

It is furthermore known that it is possible to vary the width of the pulses by means of random lengthening or shortening during a pulse-width modulation, wherein the signals consist of a square wave pulse. The variation of the pulse widths results in an increase in the number of switching frequencies. An increase in the number of switching frequencies leads to the radiated energy being distributed across the individual switching frequencies, referred to below as frequency spreading. In order to evenly distribute the energy, the variation of the pulse width must occur randomly. If the variation of the pulse occurs randomly, it is therefore not possible to reproduce or respectively determine the original pulse width and accordingly the actual information of the pulse.

SUMMARY OF THE INVENTION

The inventive electric motor according to the invention involves a frequency spread of the electromagnetically radiated energy. This is achieved by the fact that the signal duration of the individual signals varies. A further advantage is that it is possible to determine the original sequence of signals. Only the signal duration and the signal itself are necessary for the calculation. Further items of information, which, in addition to the control signal, were modulated into the sequence of signals, are retained and can be subsequently determined.

A further advantage is that the electric motor according to the invention can be easily and cost effectively integrated into existing systems.

It is particularly advantageous that a signal block comprises a defined number n of signals and that the duration of at least two signal blocks is constant. The signal blocks comprise a defined number of signals. The duration of consecutive signal blocks is constant or respectively identical. The signal block duration corresponds to the period duration of the signal blocks. The signal blocks thus have a constant frequency. The signal block beginning that recurs at periodic temporal intervals can be used as a clock signal for further devices. A constant period duration facilitates the use of the sequence of signals in a plurality of application areas around the electric motor, for example as a processor clock pulse, sensor clock pulse, communication clock pulse or for actuating the electric motor. Hence, no further hardware or software components are required for generating or calculating a clock pulse. This results in a simplification of the electric motor and therefore a simplified and cost effective production thereof. A synchronization of the individual components of an electric motor is also possible. The use of an additional cabling for transmitting a clock pulse, for example a system clock pulse, to additional components outside of the electric motor is possible by means of the subject matter according to the invention.

A particularly simple configuration is for the electric motor to be actuated by means of a sequence of signals, in particular directly or via a motor control unit. The device generates a sequence of signals that is supplied to a motor control unit. The motor control unit can also be integrated into the device. As a function of the sequence of signals, the motor control unit generates a rotational movement of the rotor of the electric motor.

It is considered to be very advantageous if each signal block comprises a first and a second signal group. As seen temporally, the signals of the first signal group are emitted before the signals of the second signal group. The signal duration of the first signal group, particularly the n−2 signals of a signal block, is determined by means of a random generator or a table, in particular a look-up table. A determination of the duration of the signals of the first signal group on the basis of a random generator or a look-up table enables the spread of the frequency spectrum of the electromagnetically radiated energy to be improved. Due to a substantially random determination of the duration of the signals, a reduced electromagnetic radiation of the electric motor is therefore to be achieved. Nevertheless, the original signal or respectively the original item of information can be ascertained, in particular calculated.

It may be appropriate for the signal duration of the signals of the second signal group, in particular the last two signals of a signal block, to be calculated or extracted from a second table. The duration of the signals of the second signal group is dependent on the duration of all the signals of the first signal group. The duration of the signals of the second signal group has to be ascertained as a function of the total duration of the signals of the first signal group, in particular calculated or determined by means of a table. The number of signals which belong to the second signal group is thus dependent on the number of signals of a signal block. The duration of all of the signals of a signal block may not exceed a previously defined duration.

It is furthermore advantageous for the signal duration of the signals of the second signal group to be calculated in such a way that the defined duration of a signal block and the sum of the duration of all the signals of a signal block are substantially the same. The signal duration of the signals of the first signal group is determined by means of a random generator or a table. In order that the duration of the signal blocks still remains constant, the duration of the last signals of a signal block is ascertained mathematically or by means of a table. This has the advantage that simple adders and subtractors are sufficient for the process. Thus, the duration of the signals of the first signal group can be implemented with a minimum of hardware and software effort. Furthermore, the duration of the signals is not calculated continuously, which is why the energy consumption of the device is reduced in comparison with a constant or continuous calculation.

It is considered to be particularly advantageous if the sequence of signals is a pulse-width modulated sequence of signals and the signal duration of a signal comprises at least the duration of a pulse and at least the duration of a pulse pause. Pulse-width modulated signals are frequently used for actuating electric motors. The pulses are substantially rectangular, triangular or sinusoidal. The pulse-width modulated signals can very easily be modulated into the signals of the sequence of signals.

It is furthermore possible for a signal to comprise a plurality of pulses.

It is advantageous for a first and a second limit value to define a range for the variation of the signal duration of the signals. By establishing limit values, the individual signals can be prevented from deviating extremely from one another. This furthermore prevents the signals from not being able to be processed by the hardware or software due to the duration of said signals. The situation is furthermore prevented in which a signal block cannot comprise the defined number of signals due to the increased signal duration of individual signals.

BRIEF DESCRIPTION OF THE DRAWINGS

An exemplary embodiment of the invention is depicted in the drawings and is explained in detail in the following description. In the drawings:

FIG. 1 shows a sequence of signals, comprising signal blocks and signals according to the prior art;

FIG. 2 shows a pulse of a pulse-width modulated signal;

DETAILED DESCRIPTION

Figure 3:
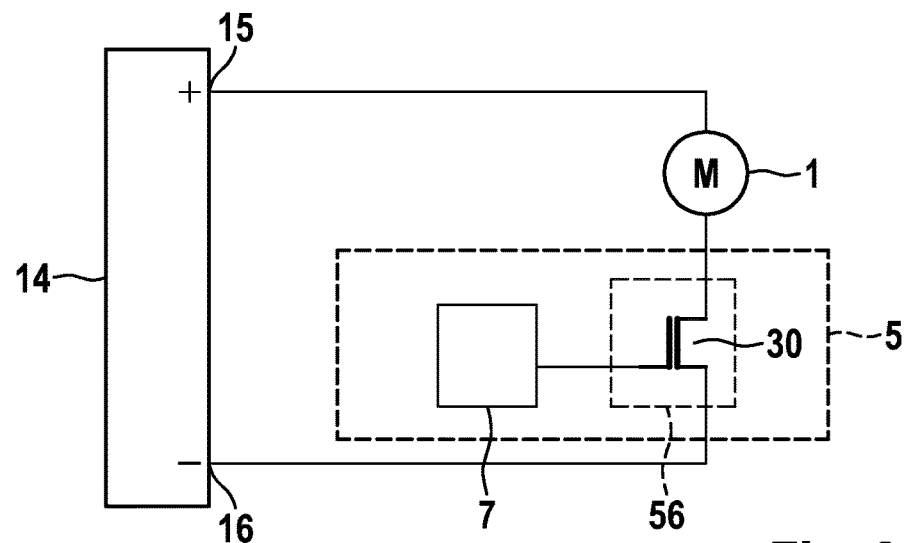
FIG. 3 shows a simple motor control unit for a brushed electric motor.

A sequence of signals 3, comprising signals 19 having a specific signal duration 20 is shown in FIG. 1. According to the invention, a sequence of signals 3 comprises a plurality, in particular at least 2, signal blocks 22. The signal blocks 22 comprise in turn a plurality, in particular at least two, signals 19. In FIG. 1, a signal block 22 comprises seven signals 19 by way of example. Each signal 19 has a constant or respectively fixed signal duration 20. The signal duration of all the signals 19 is identical in the sequence of signals pursuant to FIG. 1. The fixed signal duration can correspond to the period duration of a signal 19. The reciprocal value of the signal duration 20 corresponds to the frequency of the signal 19. As a result of the constant signal duration 20, the frequency with which a signal 19 begins is likewise constant.

A signal 19, which comprises a square-wave pulse 10, is furthermore shown by way of example in FIG. 2. According to the invention, the pulse 10 is however not limited to a rectangular shape. Triangular, round, sinusoidal pulses 10 or pulses 10 shaped in a different manner are also possible. The duration or respectively the length, in particular the width of a pulse 10 is referred to below as the pulse duration 11. The pulse duration 19 and the associated size of a pulse is decisive with regard to the amount of energy or the information which a signal 19 carries. Such a sequence of signals 3 is referred to as a pulse-width modulated sequence of signals 3.

It is furthermore possible for a signal 19 to contain a plurality of pulses 10. In the case of a square-wave pulse-width modulation, a technical variable, in particular voltage or current, changes between two values. In FIG. 2, the voltage V is specified as the technical value. The voltage V of the signal 19 changes, as is depicted in FIG. 2 between 0V and 12V, and forms a pulse 10. The height of the voltage of the pulse is dependent on the available voltage, in particular the supply voltage. The same applies to the current or the energy. In the case of a vehicle, in particular an electric bicycle, motor scooter, motorcycle, automobile, truck or bus, the supply voltage corresponds to the voltage of the battery, in particular 12-240V, preferably 12V (automobile), 24V (truck, bus) or 36V (bicycle, motor scooter).

Modern electric motors 1 are actuated with pulse-width modulated signals 19. In so doing, a desired amount of energy is transferred to the electric motor 1 as a function of the pulse duration 11. By means of the pulse-width modulation, subsequently referred to as PWM, the acceleration, the deceleration or the speed of an electric motor 1 can, for example, be determined.

Depending on the type of the electric motors 1 and the desired area of application, the device 5 comprises a motor control unit 56, comprising at least one electric switch 30 for actuating the electric motor 1. A simple configuration for the actuation of an electric motor 1 is shown in FIG. 3.

A brush commutated electric motor 1 is connected via an electric switch 30, in particular a semiconductor switch, preferably a transistor or a MOSFET to an energy source 14, which has a plus pole 15 and a minus pole 15. The electric switch 30 is switched into a conductive or blocking state in accordance with a sequence of signals 3 generated by a microprocessor 7. In switching states between 80% and 100% conductive, an electric switch 30 has an increased resistance and consequently an increased loss or respectively an increased waste heat. For that reason, the attempt is made to circumvent this range if possible or to pass through said range as quickly as possible. Due to this fact, a square-wave pulse 10 is used for most of the actuating sequences of signals. The pulse 10 can be generated when the switch 30 is switched substantially 100% into the conductive or blocking state. According to FIG. 2, the square-wave pulses 10 have pulse edges 12 that are as steep as possible. The electromagnetic radiation of the entire structure is however dependent on the steepness of the pulse edges 12. The electric switches 30 have an electromagnetic radiation in accordance with the steepness of the pulse edge 12. The line sections which conduct the sequence of pulses 3 also act like an antenna and amplify the electromagnetic energy radiated due to the configuration. An assessment must therefore be made whether an increased heating of the electric switch 30 or an increased electromagnetic radiation is possible for the area of application.

Figure 4:
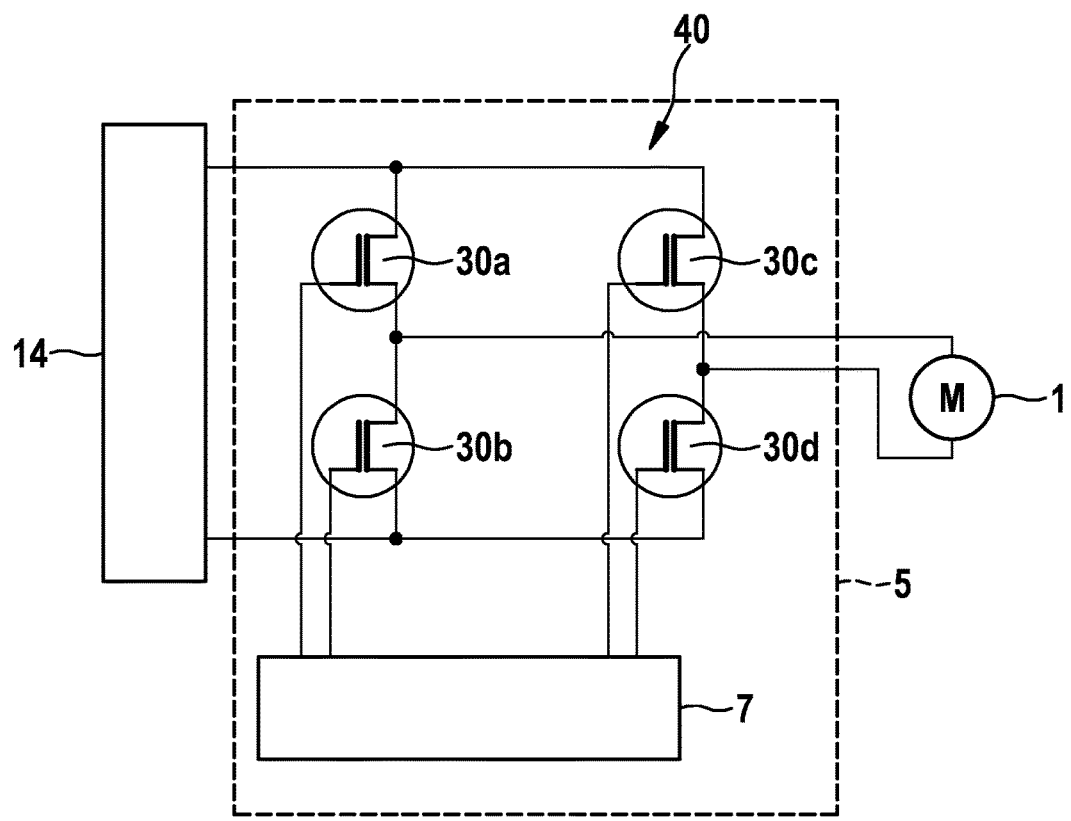
FIG. 4 shows a motor control unit comprising a full bridge.

If the electric motor is to be able to rotate forwards and backwards, further electric switches are required, as is shown in FIG. 4. The electric switches 30a to 30d are arranged as a full bridge 40. A microprocessor 7 generates a plurality of sequences 3 of signals which actuate the electric switches 30. As a function of the sequence 3 of signals, the electric switches 30 conduct or block a current flow from the energy source 14 to the electric motor 1. The electric switches generate a sequence 3 of signals comprising substantially identical signals 19. Only the height and therefore the amount of energy differentiates the sequences 3 of signals from one another. The electric switches 30a to 30d of the motor control unit or respectively the full bridge act like a signal amplifier.

Figure 5:
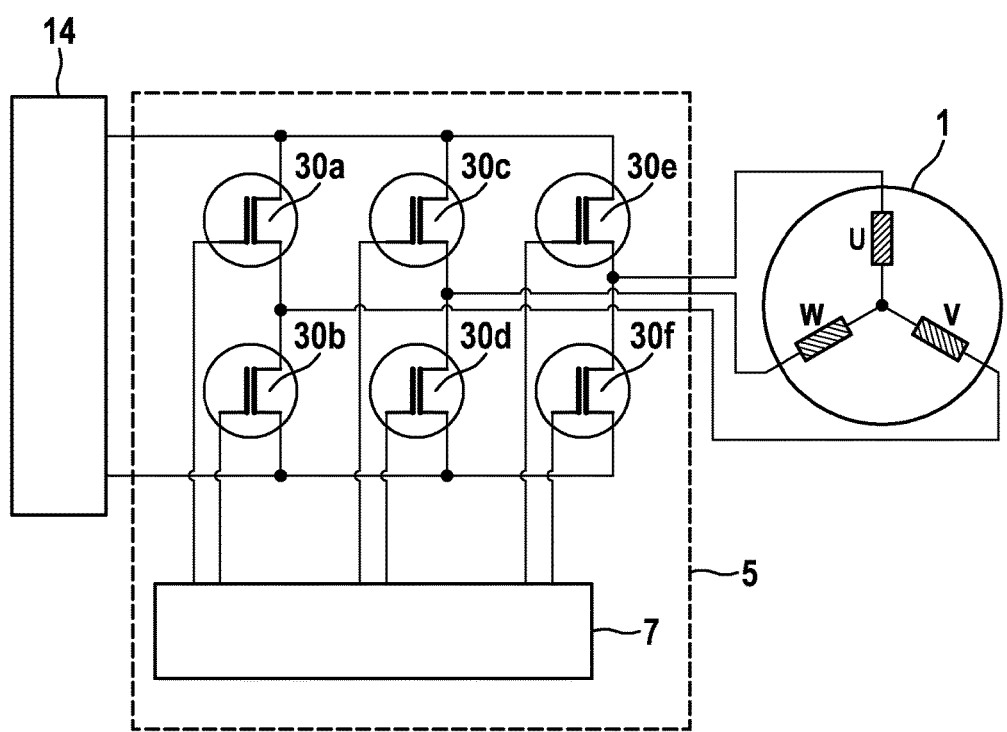
FIG. 5 shows a motor control unit for a three-phase brushless electric motor.

FIG. 5 shows an actuation of a brushless electric motor 1. The brushless electric motor 1 comprises three phases U, V and W that are wired in a star connection. The phases can comprise a plurality of coils connected in parallel or in series. It is also possible for the three phases U, V and W to be wired as a delta connection. By actuating the electric switches 30a to 30f with the sequence 3 of the signals of the device, current is passed through the phases U, V and W in accordance with the position of a rotor, of the electric motor 1. By passing current through said phases U, V and W, a rotating field is generated which attracts the magnets that are mounted to a rotor and therefore carries along the rotor. A rotor rotation is thus produced.

Figure 6:
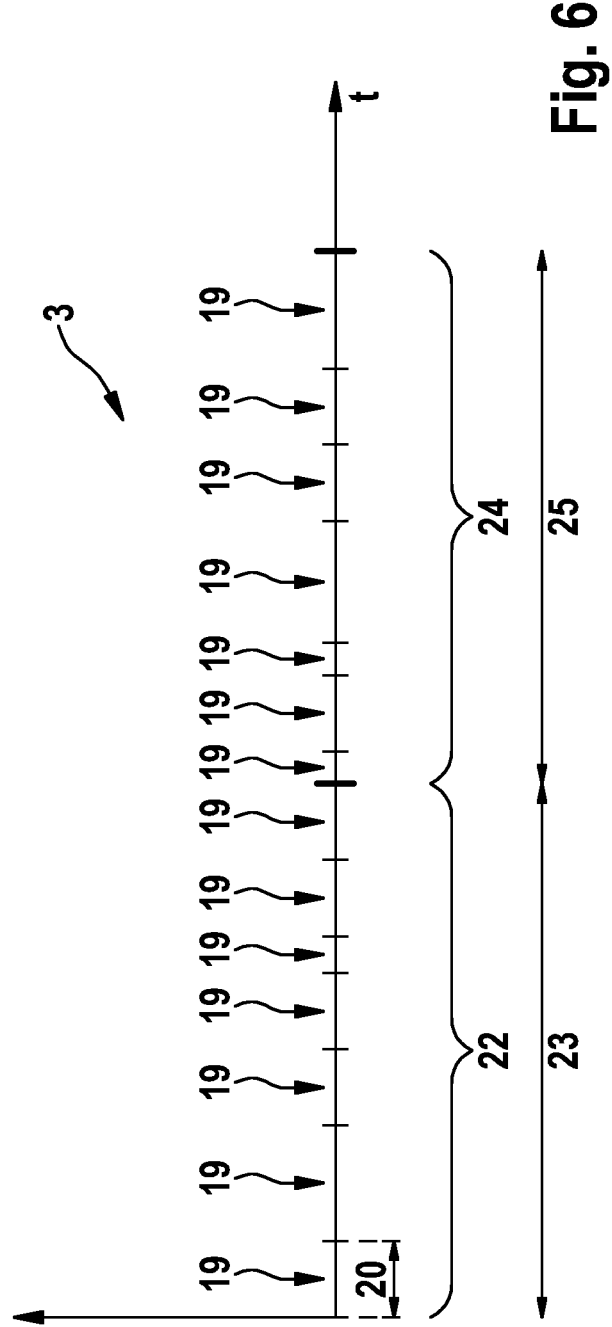
FIG. 6 shows an inventive sequence of signals generated by the device.

In FIG. 6, a sequence 3 of signals of an inventive device 5 of an electric motor 1 is depicted. In FIG. 6, a first signal block 22 and a second signal block 24 are shown in part. The two signal blocks 22, 24 as well as all other signal blocks of the sequence (3) of signals comprise by way of example 7 signals 19. The signals 19 have a signal duration 20. The signal duration 20 varies between the individual signals 19. The device 5 varies the signal duration 20 of the signals so that an identical signal duration 20 of two signals 19 in the sequence 3 occurs as seldom as possible or respectively irregularly or a repetition of an identical signal duration 20 occurs at large temporal intervals. The signal duration 20 of all of the signals of a signal block is always the same. The signal block duration 23 of the first signal block 22 is the same as the signal block duration 25 of the second signal block etc. The signal block duration 23, 25 thus corresponds to the period duration of the signal blocks 22, 24.

The constant frequency of the signal blocks 22, 24 can, for example, be used for further items of information or for clocking a further device of the electric motor 1. The chaotic sequence 3 of signals without the fixed frequency and in accordance with the prior art requires, for example, complicated algorithms in the software or hardware for an additional processing of the sequence of signals. A fixed frequency can, for example, be necessary for sensors.

Figure 7:
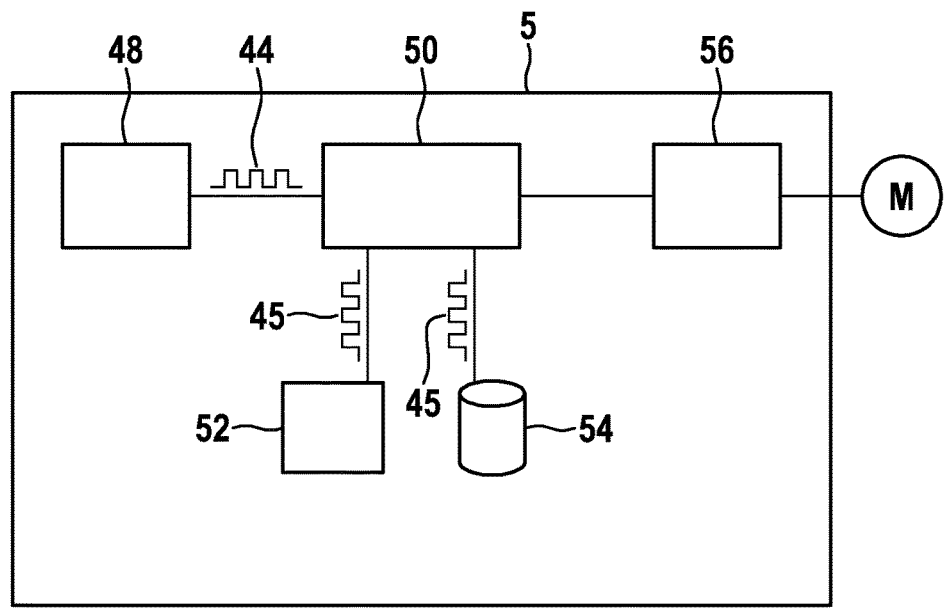
FIG. 7 shows a device.

The device 5 of the electric motor 1 generates a first sequence 44 of signals. The first sequence 44 of signals is dependent on a speed of the electric motor 1 desired by the user or an automatic control. A speed controller 48 is depicted by way of example in FIG. 7. The speed controller 48 particularly comprises an automatic control, which accesses information, for example, of a sensor, preferably a temperature sensor or a communication bus, such as CAN, LIN, etc. The first sequence 44 of signals, depicted in FIG. 7 by way of example as square-wave pulse-width modulation, is supplied to a modulator 50 in the device 5. The modulator 50 modulates the first sequence 44 of signals as a function of a second sequence 45 of signals. The second sequence 45 of signals is generated by a random generator 52, a table 54, a sensor, a further motor control unit etc. The first sequence 44 of signals is changed as a function of the second sequence 45 of signals. In so doing, the signal duration 20 of the individual signals 19 is varied. The second sequence 45 of signals could now actuate an electric motor 1 as a sequence 3 of signals. The number of the separate sequences 3 of signals is dependent on the type of actuation and the type of motor control. The sequences of signals are once again amplified by a motor control unit 56 for high-performance, electrically commutated electric motors 1 or electric motors 1 that are to run forwards and backwards. Motor control units 56 have already been show in FIGS. 3, 4 and 5 and explained in the description. The motor control units 40, 56 are, however, not limited to these motor control units 56, 40 described in an exemplary manner.

Figure 8:
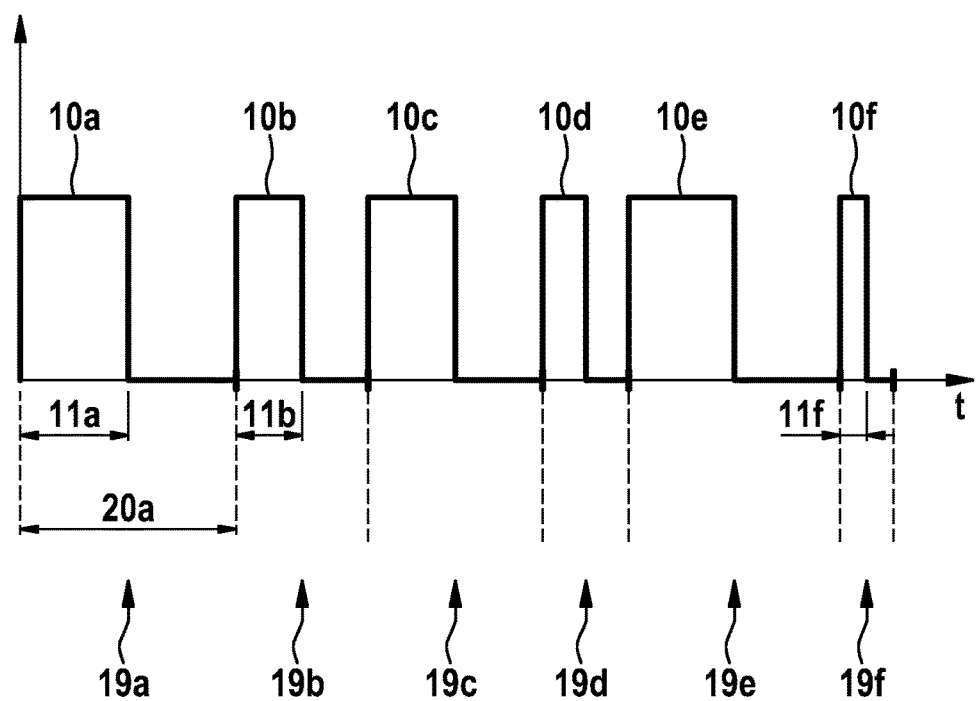
FIG. 8 shows an exemplary sequence of signals comprising pulse-width modulated signals.

In FIG. 8, a sequence of signals comprising square-wave pulse-width modulated signals 19 according to one exemplary embodiment is depicted. The signal block 22 shown by way of example comprises six signals 19. The signal duration 20 of the six signals 20a to 20f varies. Each signal 20a to 20f comprises a pulse 10a to 10f having a pulse width 11a to 11f. The pulse width 11a to 11f is determined by the microprocessor 7 or a speed controller 48. The pulse width 11 of the signals 19 corresponds to the item of information desired for transmission or to the amount of energy. In FIG. 8, the pulse width corresponds by way of example to 50% or a duty cycle to 50%. The duty cycle is the ratio of the pulse duration 11 to the signal duration 20. Hence, the pulse width 11 also corresponds to 50% of the signal duration. The additional 50% of the signal duration 20 corresponds to the pulse pause. Hence, the signal duration 20 less the pulse width 11 corresponds to the pulse pause. The PWM signal thus has a duty cycle of 50%. In the case of a duty cycle of 30%, the absolute duration of a pulse corresponds to 30% of the signal duration 20. The signal duration 20 varies between the individual signals 19a-19f. The absolute pulse width 11a to 11f varies in accordance with the signal duration 20a-20f. In so doing, the absolute pulse width 11a to 11f also varies between the individual pulses of the signals 19a-19f. The ratio between the pulse duration 11 and the signal width 20 is identical in this example. By varying the pulse duration 11, the switch-on and switch-off points in time of the electric switches are varied. The radiated energy is distributed across a wide frequency spectrum.

It is furthermore possible to vary the duty cycle from signal 19 to signal 19. It is also possible to leave the duty cycle substantially the same for all signals 19 of a signal block 22.

In order to prevent the signal duration 20 from becoming too long, limit values are predefined for the device. The limit values consist of an upper and a lower signal duration 20. The lower limit value specifies the signal duration 20 that is minimally possible. The upper limit value specifies the signal duration 20 that is maximally possible. If one of the limit values is exceeded or respectively undershot during the generation of the signal duration, the corresponding limit value is then taken as the signal duration 20. By means of the limit values, it can particularly be ensured that the sum of the signal duration 20 of the signals 19 of a signal block 22 corresponds to the signal block duration 23. Hence, the predetermined signal block duration 23 will not be exceeded or undershot.

The invention claimed is:

1. An electric motor (1) comprising a device (5) for generating a sequence (3) of signals, said sequence (3) of signals comprising a plurality of signal blocks (22) and said signal blocks (22) comprising a plurality of signals (19) having a specific signal duration (20), characterized in that the signal duration (20) of the individual signals (19) varies; wherein the signal duration (20) of the signals (19) of the second signal group are calculated such that the defined duration of a signal block (23) and the sum of the signal duration (20) of all the signals (19) of a signal block (22) are substantially the same.

2. The electric motor (1) according to claim 1, characterized in that a signal block (22) comprises a defined number n of signals (19) and the duration at least of two signal blocks (22) is constant.

3. The electric motor (1) according to claim 1, characterized in that the electric motor (1) is actuated by the sequence (3) of signals.

4. The electric motor (1) according to claim 1, characterized in that each signal block (22) comprises a first and a second signal group, wherein the signals (19) of the first signal group are emitted before the signals (19) of the second signal group and the signal duration (20) of the n−2 signals of a signal block of the first signal group is determined by a random generator (52).

5. The electric motor (1) according to claim 1, characterized in that the signal duration (20) of the signals (19) of the second signal group are calculated or extracted from a second table.

6. The electric motor (1)) according to claim 1, characterized in that the sequence (3) of signals is a pulse-width modulated sequence (3) of signals and the signal duration (20) of a signal (19) comprises at least the duration of a pulse (11) and at least the duration of a pulse pause.

7. The electric motor (1) according to claim 1, characterized in that a first and a second limit value define a range for the variation of the signal duration (20) of the signals (19).

8. The electric motor (1) according to claim 1, where the electric motor (1) is a fan motor.

9. The electric motor (1) according to claim 2, wherein the duration of all the signal blocks (22) is constant.

10. The electric motor (1) according to claim 3, characterized in that the electric motor (1) is actuated directly by the sequence (3) of signals.

11. The electric motor (1) according to claim 3, characterized in that the electric motor (1) is actuated via a motor control unit (56) by the sequence (3) of signals.

12. The electric motor (1) according to claim 1, characterized in that each signal block (22) comprises a first and a second signal group, wherein the signals (19) of the first signal group are emitted before the signals (19) of the second signal group and the signal duration (20) of the n−2 signals of a signal block of the first signal group is determined by a table (54).

13. The electric motor (1) according to claim 12 wherein the table (54) is a look-up table.

14. The electric motor (1) according to claim 1, characterized in that the signal duration (20) the two last signals (19) of a signal block of the second signal group are calculated or extracted from a second table.

* * * * *